US009578599B2

(12) United States Patent
Kore et al.

(10) Patent No.: US 9,578,599 B2
(45) Date of Patent: Feb. 21, 2017

(54) SYSTEM AND METHOD FOR OPTIMIZING BATTERY LIFE IN WIRELESS MULTI-HOP COMMUNICATION SYSTEMS

(71) Applicant: Honeywell International Inc., Morristown, NJ (US)

(72) Inventors: Vinayak Sadashiv Kore, Bangalore (IN); Jason M. Farrell, Batavia, IL (US); Andrew G. Berezowski, Wallingford, CT (US); Edward J. Kurtz, Saint Charles, IL (US); Mark C. Bohanon, Aurora, IL (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 89 days.

(21) Appl. No.: 14/243,202

(22) Filed: Apr. 2, 2014

(65) Prior Publication Data

US 2014/0321344 A1    Oct. 30, 2014

Related U.S. Application Data

(66) Substitute for application No. 61/815,924, filed on Apr. 25, 2013.

(51) Int. Cl.
*H04W 52/02* (2009.01)
*H04L 29/08* (2006.01)
*H04W 84/18* (2009.01)

(52) U.S. Cl.
CPC ..... *H04W 52/0212* (2013.01); *H04W 52/0206* (2013.01); *H04L 29/0863* (2013.01); *H04W 84/18* (2013.01)

(58) Field of Classification Search
CPC .................................................. H04L 29/0863

USPC .......................... 370/458, 464–465, 527, 529
See application file for complete search history.

(56) References Cited

U.S. PATENT DOCUMENTS

| 5,615,329 | A  | * | 3/1997  | Kern ................. G06F 11/2064 714/6.12 |
| 7,184,413 | B2 | * | 2/2007  | Beyer ................... H04J 3/0667 370/254 |
| 7,606,210 | B2 | * | 10/2009 | Ratiu .................... H04W 28/06 370/254 |
| 8,194,592 | B2 |   | 6/2012  | Kore et al. |
| 8,345,615 | B2 | * | 1/2013  | Barraclough ......... H04W 28/06 370/329 |
| 2002/0027504 | A1 | * | 3/2002 | Davis .................... G01D 4/004 340/540 |

(Continued)

OTHER PUBLICATIONS

European Search Report for corresponding EP patent application 14164510.1, dated Oct. 6, 2014.

*Primary Examiner* — Warner Wong
(74) *Attorney, Agent, or Firm* — Husch Blackwell LLP

(57) ABSTRACT

Systems and methods for optimizing battery life in wireless multi-hop communication systems are provided. Some methods include a child node transmitting a data packet to a parent node in a wireless system, wherein the data packet includes a parent node identifier, data information, and a length of the data information, and wherein the data packet omits inclusion of a child node identifier. Some methods include a parent node receiving a data packet from a child node in a wireless system, wherein the data packet includes a parent node identifier, data information, and a length of the data information, and wherein the data packet omits inclusion of a child node identifier.

14 Claims, 7 Drawing Sheets

(56) References Cited

U.S. PATENT DOCUMENTS

| | | | | |
|---|---|---|---|---|
| 2002/0031101 | A1* | 3/2002 | Petite | G01D 4/004 |
| | | | | 370/310 |
| 2003/0151513 | A1* | 8/2003 | Herrmann | G08B 25/003 |
| | | | | 340/573.1 |
| 2004/0185845 | A1* | 9/2004 | Abhishek | H04W 88/08 |
| | | | | 455/422.1 |
| 2006/0050742 | A1* | 3/2006 | Grandhi | H04W 74/0816 |
| | | | | 370/506 |
| 2007/0274272 | A1* | 11/2007 | Joshi | H04L 1/0001 |
| | | | | 370/338 |
| 2008/0244086 | A1* | 10/2008 | Patel | H04L 12/66 |
| | | | | 709/238 |
| 2008/0304485 | A1* | 12/2008 | Sinha | H04L 12/66 |
| | | | | 370/392 |
| 2009/0271467 | A1* | 10/2009 | Boers | H04L 45/02 |
| | | | | 709/201 |
| 2009/0316622 | A1* | 12/2009 | Hirano | H04L 45/36 |
| | | | | 370/328 |
| 2010/0142407 | A1 | 6/2010 | Serravalle | |
| 2010/0329281 | A1* | 12/2010 | Tazaki | H04L 61/106 |
| | | | | 370/466 |
| 2012/0031984 | A1* | 2/2012 | Feldmeier | F24F 11/001 |
| | | | | 236/49.3 |
| 2012/0230370 | A1* | 9/2012 | Shaffer | H04B 1/713 |
| | | | | 375/133 |
| 2013/0070646 | A1* | 3/2013 | Myers | H04W 84/18 |
| | | | | 370/255 |
| 2013/0094447 | A1* | 4/2013 | Gidlund | H04L 69/22 |
| | | | | 370/328 |

\* cited by examiner

SYSTEM AND METHOD FOR OPTIMIZING BATTERY LIFE IN WIRELESS MULTI-HOP COMMUNICATION SYSTEMS

CROSS-REFERENCE TO RELATED APPLICATIONS

This application claims priority to U.S. Provisional Patent Application No. 61/815,924 filed Apr. 25, 2013 and titled "Wireless Multihop Communication System Optimized for Battery Life". U.S. Application No. 61/815,924 is hereby incorporated by reference.

FIELD

The present invention relates generally to wireless multi-hop communication systems. More particularly, the present invention relates to systems and methods for optimizing battery life in wireless multi-hop communication systems.

BACKGROUND

Many fire, security, and other monitoring systems employ battery operated radio frequency (RF) transceivers to form a wireless mesh network. However, such systems must minimize the amount of data transmitted via the wireless mesh network in order to maximize battery life of the transceivers.

In known systems, a message that originates at a first receiver in a wireless mesh network may be repeated at other transceivers, and some transceivers may insert additional information into a received data packet before transmitting the data packet and the inserted additional information. Furthermore, in known systems, a source node or transceiver inserts its unique identifier (ID) so that the source and path taken for each piece of information in a data packet is readily accessible at a destination node.

However, it is desirable to conserve additional battery power in the transceivers and nodes. Therefore, there is a continuing, ongoing need for improved systems and methods for optimizing battery life in wireless multi-hop communication systems.

DETAILED DESCRIPTION

Figure 1:
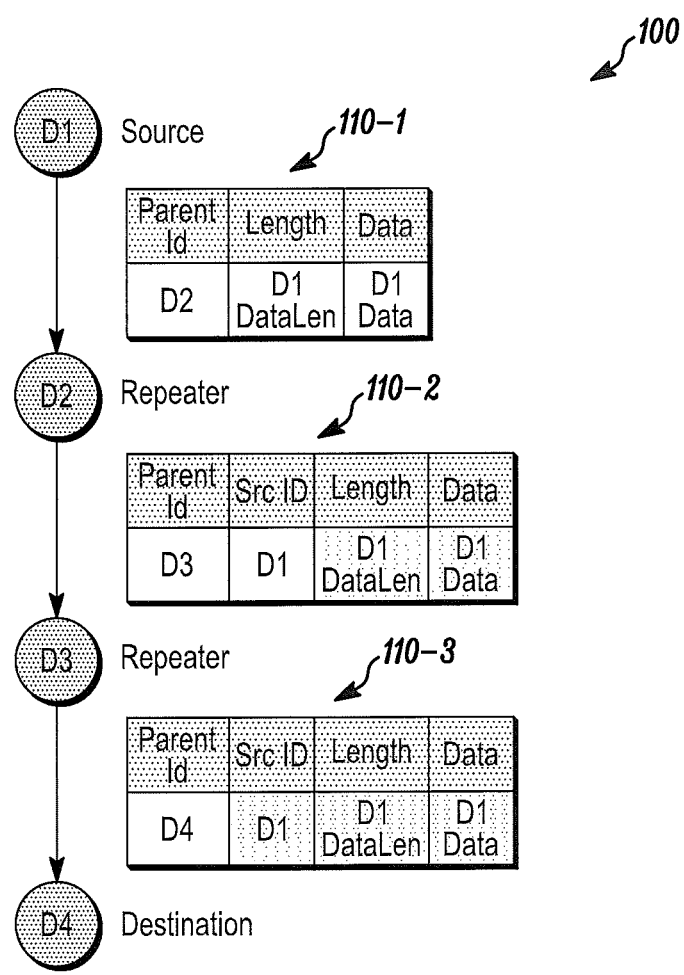
FIG. 1 is a block diagram of a system and method of a source node transmitting data in a wireless mesh network in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods for optimizing battery life in wireless multi-hop communication systems. In some embodiments, the amount of data transferred between transceivers and nodes in the communication system can be reduced and/or minimized, thereby reducing transmission time and conserving battery power. For example, the source node ID and repeater node ID need not be included at every transmission step. However, in accordance with disclosed embodiments, even with such an omission, the data source information for all elements of a transmitted data packet can be identified by a destination node.

In some embodiments, systems and methods disclosed herein can include a time slotted wireless mesh network. In such embodiments, a repeater node need not include its ID for identifying the transmission path of a data packet. Furthermore, a source node need not include its ID when transmitting its data to a parent node, for example, a repeater node. However, the parent node and/or the repeater node can insert the ID of the source node into the data packet, either directly or in the form of the source node's position in a bitmap.

The time slotted wireless mesh network disclosed herein can include any number and type of nodes as would be understood by those of ordinary skill in the art. It is to be understood that reference to a node herein can include a transceiver, a transmitter, a receiver, a source node, a parent node, a child node, a repeater node, a destination node, a repeater/source node, and any other type of device or node as would be understood by those or ordinary skill in the art.

In accordance with some embodiments, a node can have one, two, three, or more parent nodes, including, for example, a first repeater node or a direct repeater node. Furthermore, each parent node can have multiple child nodes. During set up of the wireless mesh network, each node can perform discovery to identify its parent and child nodes, which can be used for routing data packets that are transmitted either simultaneously or separately.

In some embodiments, each node in the wireless mesh network can be allocated a unique transmit time slot for transmission of its data packet to each of its parent nodes either simultaneously or separately. Parent nodes can wake up, that is, exit a low power sleep state, to receive a data packet during a child node's allocated transmit time slot. Then, a parent node can aggregate its data with the data received from its child nodes so that the parent node transmits a single data packet.

In some embodiments disclosed herein, only one node in the wireless multi-hop communication system can have data to transmit. For example, FIG. 1 is a block diagram of a system and method of a source node D1 transmitting data in a wireless mesh network 100 in accordance with disclosed embodiments.

As seen in FIG. 1, during its transmit time slot, the source node D1 can transmit a data packet 110-1 to its parent node D2, which, in this embodiment, is a repeater node. The data packet 110-1 transmitted by the source node D1 can include its parent node ID, D2, the length of its data to be transmitted, D1 DataLen, and its data to be transmitted, D1 Data.

The repeater node D2 can insert into the received data packet the ID of the source node for the received data based on slot number assignments. Then, during its transmit time slot, the repeater node D2 can transmit a data packet 110-2 to its parent node D3, which, in this embodiment, is also a repeater node. The data packet 110-2 transmitted by the repeater node D2 can include its parent node ID, D3, the inserted source node ID, D1, the length of the previously inserted data to be transmitted, D1 DataLen, and the previously inserted data to be transmitted, D1 Data.

Because the repeater node D2 did not transmit its own additional data, the repeater node D3 need not insert any additional node ID of a source node into the received data packet. Accordingly, during its transmit time slot, the repeater node D3 can transmit a data packet 110-3 to its parent node D4, which, in this embodiment, is a destination node. The data packet 110-3 transmitted by the repeater node D3 can include its parent node ID, D4, the previously inserted source node ID, D1, the length of the previously inserted data to be transmitted, D1 DataLen, and the previously inserted data to be transmitted, D1 Data.

In some embodiments disclosed herein, all nodes in the wireless multi-hop communication system can have data to transmit. For example, FIG. 2 is a block diagram of a system and method of a source node D1 and multiple repeater nodes D2, D3 transmitting data in a wireless mesh network 200 in accordance with disclosed embodiments.

Figure 2:
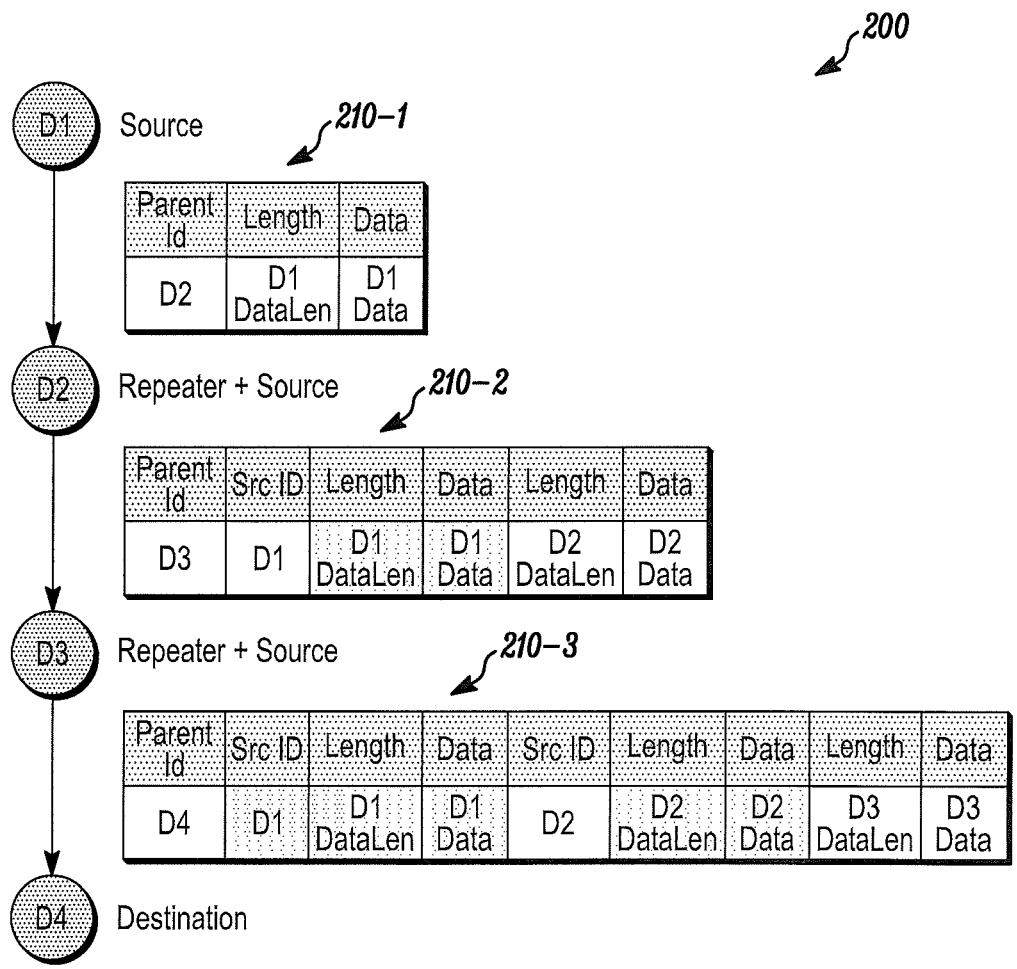
FIG. 2 is a block diagram of a system and method of a source node and multiple repeater nodes transmitting data in a wireless mesh network in accordance with disclosed embodiments.

As seen in FIG. 2, during its transmit time slot, the source node D1 can transmit a data packet 210-1 to its parent node D2, which, in this embodiment, is a repeater/source node. The data packet 210-1 transmitted by the source node D1 can include its parent node ID, D2, the length of its data to be transmitted, D1 DataLen, and its data to be transmitted, D1 Data.

The repeater/source node D2 can insert into the received data packet the ID of the source node for the received data based on slot number assignments and also insert its own data for transmitting to the next node. Then, during its transmit time slot, the repeater/source node D2 can transmit a data packet 210-2 to its parent node D3, which, in this embodiment, is also a repeater/source node. The data packet 210-2 transmitted by the repeater/source node D2 can include its parent node ID, D3, the inserted source node ID, D1, the length of the previously inserted data to be transmitted, D1 DataLen, the previously inserted data to be transmitted, D1 Data, the length of its data to be transmitted, D2 DataLen, and its data to be transmitted, D2 Data.

The repeater/source node D3 can insert into the received data packet the ID of the source node for the received data based on slot number assignments and also insert its own data for transmitting to the next node. Then, during its transmit time slot, the repeater/source node D3 can transmit a data packet 210-3 to its parent node D4, which, in this embodiment, is a destination node. The data packet 210-3 transmitted by the repeater/source node D3 can include its parent node ID, D4, the previously inserted source node ID, D1, the length of the previously inserted data to be transmitted, D1 DataLen, the previously inserted data to be transmitted, D1 Data, the inserted source node ID, D2, the length of the previously inserted data to be transmitted, D2 DataLen, the previously inserted data to be transmitted, D2 Data, the length of its data to be transmitted, D3 DataLen, and its data to be transmitted, D3 Data.

Figure 4:
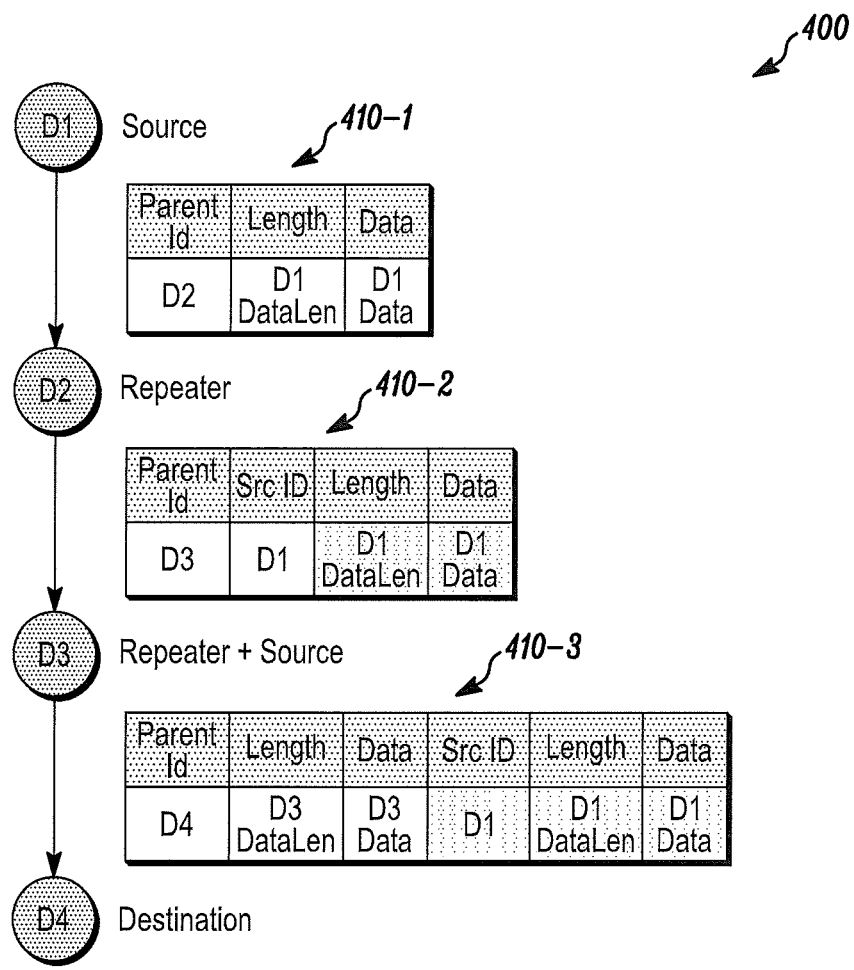
FIG. 4 is a block diagram of a system and method of a source node and one repeater node transmitting data in a wireless mesh network in accordance with disclosed embodiments.
Figure 5:
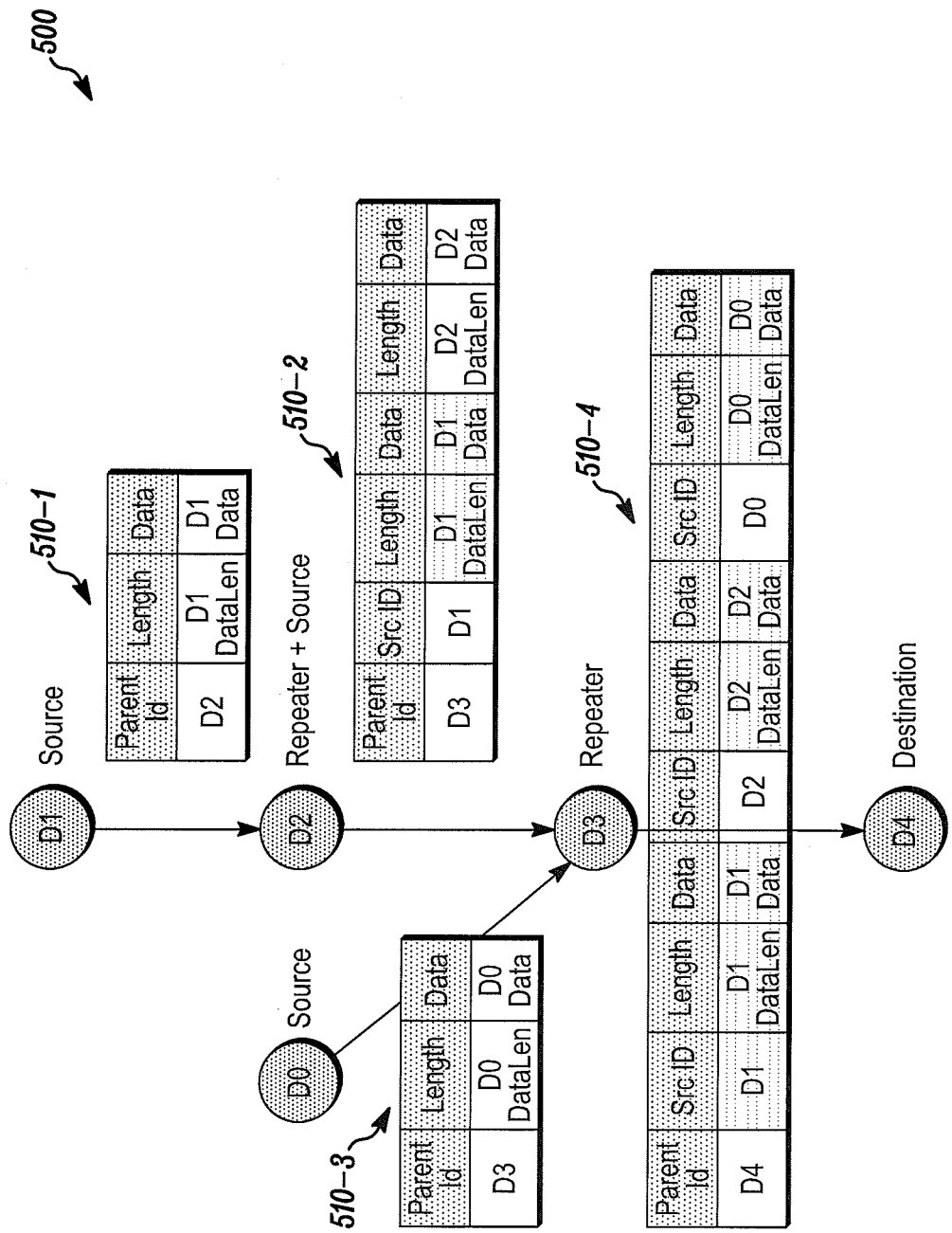
FIG. 5 is a block diagram of a system and method of multiple source nodes and one repeater node transmitting data in a wireless mesh network in accordance with disclosed embodiments.

In some embodiments, some nodes in the wireless multi-hop communication system can have data to transmit, and some nodes in the wireless multi-hop communication system can have no data to transmit. For example, FIG. 3 is a block diagram of a system and method of a source node D1 and one repeater node D2 transmitting data in a wireless mesh network 300 in accordance with disclosed embodiments, FIG. 4 is a block diagram of a system and method of a source node D1 and one repeater node D3 transmitting data in a wireless mesh network 400 in accordance with disclosed embodiments, and FIG. 5 is a block diagram of a system and method of multiple source nodes D0, D1 and one repeater node D2 transmitting data in a wireless mesh network 500 in accordance with disclosed embodiments.

Figure 3:
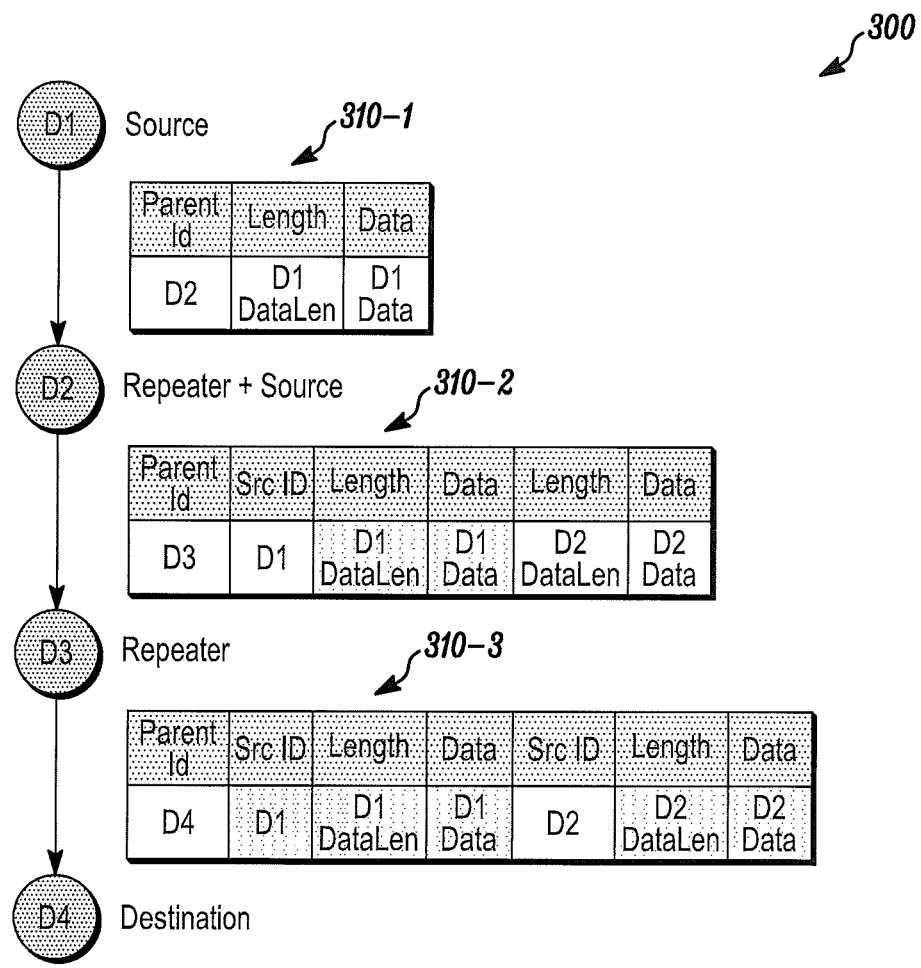
FIG. 3 is a block diagram of a system and method of a source node and one repeater node transmitting data in a wireless mesh network in accordance with disclosed embodiments.

As seen in FIG. 3, during its transmit time slot, the source node D1 can transmit a data packet 310-1 to its parent node D2, which, in this embodiment, is a repeater/source node. The data packet 310-1 transmitted by the source node D1 can include its parent node ID, D2, the length of its data to be transmitted, D1 DataLen, and its data to be transmitted, D1 Data.

The repeater/source node D2 can insert into the received data packet the ID of the source node for the received data based on slot number assignments and also insert its own data for transmitting to the next node. Then, during its transmit time slot, the repeater/source node D2 can transmit a data packet 310-2 to its parent node D3, which, in this embodiment, is a repeater node. The data packet 310-2 transmitted by the repeater/source node D2 can include its parent node ID, D3, the inserted source node ID, D1, the length of the previously inserted data to be transmitted, D1 Data Len, the previously inserted data to be transmitted, D1 Data, the length of its data to be transmitted, D2 DataLen, and the length of its data to be transmitted, D2 Data.

The repeater node D3 can insert into the received data packet the ID of the source node for the received data based on slot number assignments. Then, during its transmit time slot, the repeater node D3 can transmit a data packet 310-3 to its parent node D4, which, in this embodiment, is a destination node. The data packet 310-3 transmitted by the repeater node D3 can include its parent node ID, D4, the previously inserted source node ID, D1, the length of the previously inserted data to be transmitted, D1 DataLen, the previously inserted data to be transmitted, D1 Data, the inserted source node ID, D2, the length of the previously inserted data to be transmitted, D2 DataLen, and the previously inserted data to be transmitted, D2 Data.

As seen in FIG. 4, during its transmit time slot, the source node D1 can transmit a data packet 410-1 to its parent node D2, which, in this embodiment, is a repeater node. The data packet 410-1 transmitted by the source node D1 can include its parent node ID, D2, the length of its data to be transmitted, D1 DataLen, and its data to be transmitted, D1 Data.

The repeater node D2 can insert into the received data packet the ID of the source node for the received data based on slot number assignments. Then, during its transmit time slot, the repeater node D2 can transmit a data packet 410-2 to its parent node D3, which, in this embodiment, is a repeater/source node. The data packet 410-2 transmitted by the repeater node D2 can include its parent node ID, D3, the inserted source node ID, D1, the length of the previously inserted data to be transmitted, D1 DataLen, and the previously inserted data to be transmitted, D1 Data.

Because the repeater node D2 did not transmit its own additional data, the repeater/source node D3 need not insert any additional node ID of a source node into the received data packet. However, the repeater/source node D3 can insert into the received data packet its own data for transmitting to the next node. Then, during its transmit time slot, the repeater/source node D3 can transmit a data packet 410-3 to its parent node D4, which, in this embodiment, is a destination node. The data packet 410-3 transmitted by the repeater/source node D3 can include its parent node ID, D4, the length of its data to be transmitted, D3 DataLen, its data to be transmitted, D3 Data, the previously inserted source node ID, D1, the length of the previously inserted data to be transmitted, D1 DataLen, and the previously inserted data to be transmitted, D1 Data.

As seen in FIG. 5, during its transmit time slot, the source node D1 can transmit a data packet 510-1 to its parent node D2, which, in this embodiment, is a repeater/source node. The data packet 510-1 transmitted by the source node D1 can include its parent node ID, D2, the length of its data to be transmitted, D1 DataLen, and its data to be transmitted, D1 Data.

The repeater/source node D2 can insert into the received data packet the ID of the source node for the received data based on slot number assignments and also insert its own data for transmitting to the next node. Then, during its transmit time slot, the repeater/source node D2 can transmit a data packet 510-2 to its parent node D3, which, in this embodiment, is a repeater node. The data packet 510-2 transmitted by the repeater/source node D2 can include its parent node ID, D3, the inserted source node ID, D1, the length of the previously inserted data to be transmitted, D1 DataLen, the previously inserted data to be transmitted, D1 Data, the length of its data to be transmitted, D2 DataLen, and its data to be transmitted, D2 Data.

The source node D0 can also transmit a data packet 510-3 to its parent node D3, which, as explained above, in this embodiment, is a repeater node. The data packet 510-3 transmitted by the source node D0 can include its parent node ID, D3, the length of its data to be transmitted, D0 DataLen, and its data to be transmitted, D0 Data.

The repeater node D3 can insert into the received data packet the ID of the source node for the received data based on slot number assignments. Then, during its transmit time slot, the repeater node D3 can transmit a data packet 510-4 to its parent node D4, which, in this embodiment, is a destination node. The data packet 510-4 transmitted by the repeater node D3 can include its parent node ID, D4, the previously inserted source node ID, D1, the length of the previously inserted data to be transmitted, D1 DataLen, the previously inserted data to be transmitted, D1 Data, the inserted source node ID, D2, the length of the previously inserted data to be transmitted, D2 DataLen, the previously inserted data to be transmitted, D2 Data, the inserted source node ID, D0, the length of the previously inserted data to be transmitted, D0 DataLen, and the previously inserted data to be transmitted, D0 Data.

In some embodiments, a parent node can insert the ID of a source node into a data packet in the form of the source node's position in a bitmap. For example, FIG. 6 is illustrative of these embodiments when all nodes in the wireless multi-hop communication system 600 have data to transmit.

Figure 6:
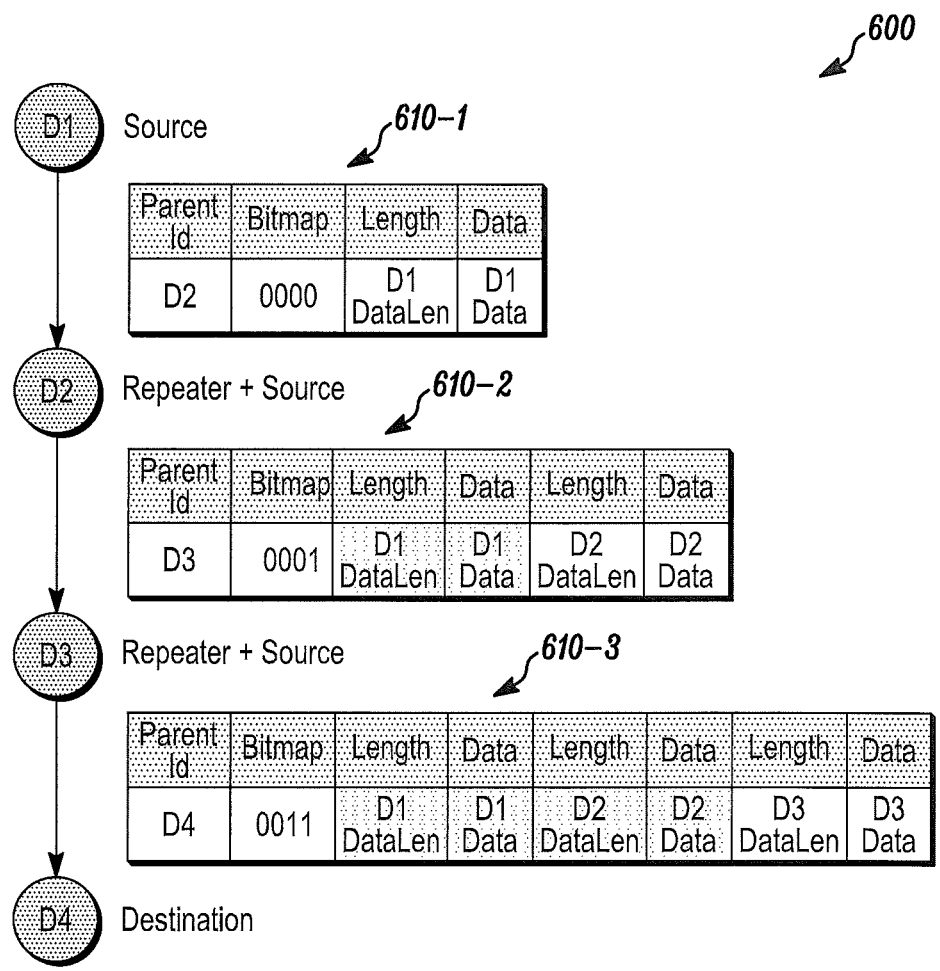
FIG. 6 is a block diagram of a system and method of a source node and multiple repeater nodes transmitting data in a wireless mesh network and using a bitmap in accordance with disclosed embodiments.

As seen in FIG. 6, during its transmit time slot, the source node D1 can transmit a data packet 610-1 to its parent node D2, which, in this embodiment, is a repeater/source node. The data packet 610-1 transmitted by the source node D1 can include its parent node ID, D2, a bitmap, the length of its data to be transmitted, D1 DataLen, and its data to be transmitted, D1 Data.

The repeater/source node D2 can insert data into the bitmap of the received data packet to indicate the ID of the source node for the received data based on slot number assignments and also insert its own data into the received data packet for transmitting to the next node. Then, during its transmit time slot, the repeater/source node D2 can transmit a data packet 610-2 to its parent node D3, which, in this embodiment, is also a repeater/source node. The data packet 610-2 transmitted by the repeater/source node D2 can include its parent node ID, D3, the bitmap with the inserted data indicating that the ID of the source node is D1, the length of the previously inserted data to be transmitted, D1 DataLen, the previously inserted data to be transmitted, D1 Data, the length of its data to be transmitted, D2 DataLen, and its data to be transmitted, D2 Data.

The repeater/source node D3 can insert data into the bitmap of the received data packet to indicate the ID of the source node of the received data based on slot number assignments and also insert its own data into the received data packet for transmitting to the next node. Then, during its transmit time slot, the repeater/source node D3 can transmit a data packet 610-3 to its parent node D4, which, in this embodiment, is a destination node. The data packet 610-3 transmitted by the repeater/source node D3 can include its parent node ID, D4, the bitmap with the inserted and previously inserted data indicating that the ID's of the source nodes are D1 and D2, the length of the previously inserted data to be transmitted, D1 DataLen, the previously inserted data to be transmitted, D1 Data, the length of the previously inserted data to be transmitted, D2 DataLen, the previously inserted data to be transmitted, D2 Data, the length of its data to be transmitted, D3 DataLen, and its data to be transmitted, D3 Data.

Figure 7:
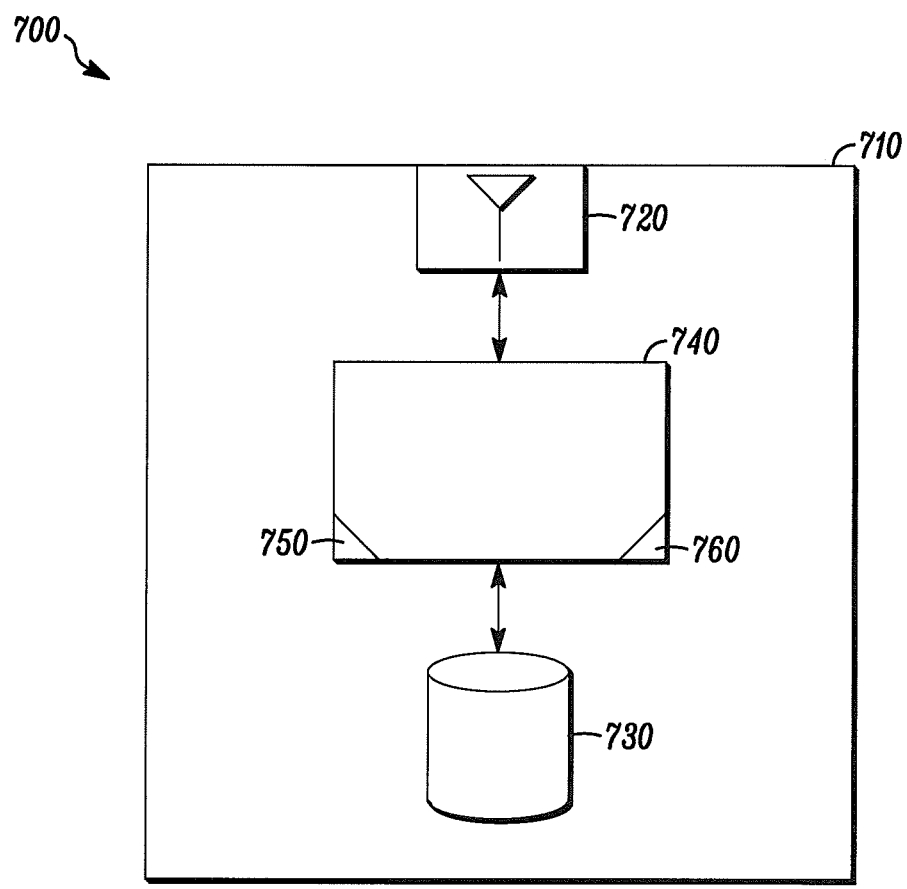
FIG. 7 is a block diagram of a node in accordance with disclosed embodiments.

As explained above, nodes in accordance with disclosed embodiments can include a transceiver, a transmitter, a receiver, a source node, a parent node, a child node, a repeater node, a destination node, a repeater/source node, and any other type of device or node as would be understood by those or ordinary skill in the art. FIG. 7 is a block diagram of an exemplary node 700 in accordance with disclosed embodiments.

As seen in FIG. 7, the node 700 can include a housing 710, a transceiver and/or radio 720, a memory device 730, control circuitry 740, one or more programmable processors 750, and executable control software 760 as would be understood by those of ordinary skill in the art. The executable control software 760 can be stored on a transitory or non-transitory local computer readable medium, including, but not limited to, local computer memory, RAM, optical storage media, magnetic storage media, flash memory, and the like. In some embodiments, the control circuitry 740, the programmable processors 750, and/or the control software 760 can execute and control the transmission methods described above.

Although a few embodiments have been described in detail above, other modifications are possible. For example, the logic flows described above do not require the particular order described or sequential order to achieve desirable results. Other steps may be provided, or steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
a child node transmitting a first data packet to a first parent node in a wireless system; and
the first parent node transmitting a second data packet to a second parent node in the wireless system,
wherein the second parent node is a parent node of the first parent node,
wherein the first data packet includes a first identifier identifying the first parent node, first data information, and a first length of the first data information,
wherein the child node identifies itself to the first parent node based on a first assigned time slot during which the first data packet is transmitted, but the first data packet omits inclusion of a child node identifier,
wherein the second data packet includes a second identifier identifying the second parent node, the child node identifier, the first data information, and the first length of the first data information, and
wherein the first parent node identifies itself to the second parent node based on a second assigned time slot during which the second data packet is transmitted, but the second data packet omits inclusion of the first identifier identifying the first parent node.

2. The method of claim 1 further comprising:
the first parent node inserting the child node identifier into the second data packet.

3. The method of claim 2 wherein the first parent node inserting the child node identifier into the second data packet includes the first parent node inserting the child node identifier directly into the second data packet.

4. The method of claim 2 wherein the first parent node inserting the child node identifier into the second data packet includes the first parent node inserting the child node identifier into a position of the child node in a bitmap in the second data packet.

5. The method of claim 1 further comprising:
the first parent node inserting second data information and a second length of the second data information into the second data packet.

6. The method of claim 1 wherein the child node is at least one of a source node, a repeater node, and a repeater/source node.

7. The method of claim 1 wherein the first parent node is at least one of a source node, a repeater node, and a repeater/source node.

8. A method comprising:
a first parent node receiving a first data packet from a child node in a wireless system; and
a second parent node receiving a second data packet from the first parent node in the wireless system,
wherein the second node is a parent node of the first parent node,
wherein the first data packet includes a first identifier identifying the first parent node, first data information, and a first length of the first data information,
wherein the first parent node identifies the child node based on a first assigned time slot during which the first data packet is transmitted, but the first data packet omits inclusion of a child node identifier,
wherein the second data packet includes a second identifier identifying the second parent node, the child node identifier, the first data information, and the first length of the first data information, and
wherein the second parent node identifies the first parent node based on a second assigned time slot during which the second data packet is transmitted, but the second data packet omits inclusion of the first identifier identifying the first parent node.

9. The method of claim 8 further comprising:
the first parent node inserting the child node identifier into the second data packet.

10. The method of claim 9 wherein the first parent node inserting the child node identifier into the second data packet includes the first parent node inserting the child node identifier directly into the second data packet.

11. The method of claim 9 wherein the first parent node inserting the child node identifier into the second data packet includes the first parent node inserting the child node identifier into a position of the child node in a bitmap in the second data packet.

12. The method of claim 8 further comprising:
the first parent node inserting second data information and a second length of the second data information into the second data packet.

13. The method of claim 8 wherein the child node is at least one of a source node, a repeater node, and a repeater/source node.

14. The method of claim 8 wherein the first parent node is at least one of a source node, a repeater node, and a repeater/source node.

* * * * *